(12) United States Patent
Kaltenbach

(10) Patent No.: US 9,718,463 B2
(45) Date of Patent: *Aug. 1, 2017

(54) DRIVE TRAIN WITH AN AUTOMATED AUXILIARY-RANGE TRANSMISSION

(75) Inventor: Johannes Kaltenbach, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 957 days.

This patent is subject to a terminal disclaimer.

(21) Appl. No.: 13/806,627

(22) PCT Filed: May 5, 2011

(86) PCT No.: PCT/EP2011/057169

§ 371 (c)(1),
(2), (4) Date: May 7, 2013

(87) PCT Pub. No.: WO2012/000704

PCT Pub. Date: Jan. 5, 2012

(65) Prior Publication Data

US 2013/0217537 A1    Aug. 22, 2013

(30) Foreign Application Priority Data

Jun. 28, 2010  (DE) .................. 10 2010 030 576

(51) Int. Cl.
*B60W 20/00*       (2016.01)
*B60W 20/40*       (2016.01)
(Continued)

(52) U.S. Cl.
CPC ............ *B60W 20/40* (2013.01); *B60K 6/387* (2013.01); *B60K 6/48* (2013.01); *B60K 6/547* (2013.01);
(Continued)

(58) Field of Classification Search
CPC .......... F16H 3/72; F16H 3/724; F16H 37/046; F16H 61/70; B60W 10/111; B60W 20/40; B60W 20/00; B60K 6/48; B60K 6/547
See application file for complete search history.

(56) References Cited

U.S. PATENT DOCUMENTS 5,856,709 A  *  1/1999  Ibaraki et al. ................... 290/45
8,663,065 B2 *  3/2014  Kaltenbach ............ B60K 6/387
                                                        477/15
(Continued)

FOREIGN PATENT DOCUMENTS

DE   199 62 854 A1   7/2001
DE   101 52 477 A1   5/2003
(Continued)

OTHER PUBLICATIONS

International Search Report issued in International Application No. PCT/EP2011/057169, mailed Jun. 27, 2011, (With an English Translation) 7 pages.
(Continued)

*Primary Examiner* — Huan Le
(74) *Attorney, Agent, or Firm* — Brinks Gilson & Lione

(57) ABSTRACT

A drive train of a motor vehicle, with a hybrid drive having an internal combustion engine, and an electric machine, and an automated auxiliary range transmission, wherein the automated auxiliary range transmission has at least one main transmission and an auxiliary range unit mounted downstream of the main transmission, in particular as a range group, wherein an input shaft of the automated auxiliary range transmission is connected to the internal combustion engine of the hybrid drive via a controllable starter clutch, and an axle shaft of the automated auxiliary range transmission is connected to an axle drive, wherein the electric machine of the hybrid drive can be coupled to the force flux or torque flux of the drive train between the main transmis-
(Continued)

Figure 1:
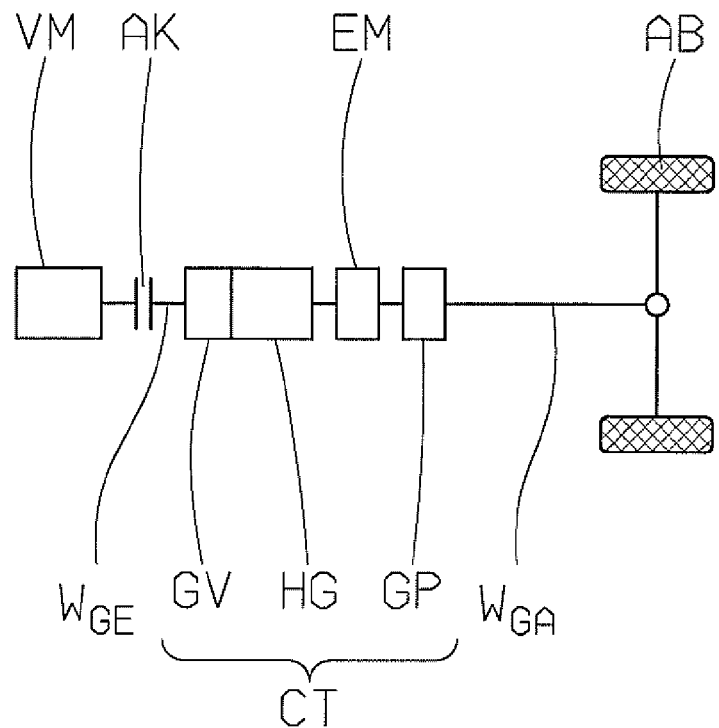

sion and the auxiliary range unit and/or between the auxiliary range unit and the axle drive.

18 Claims, 6 Drawing Sheets

(51) Int. Cl.
    *B60K 6/387*     (2007.10)
    *B60K 6/48*     (2007.10)
    *B60K 6/547*     (2007.10)
    *B60W 10/08*     (2006.01)
    *B60W 10/111*     (2012.01)
    *B60W 30/19*     (2012.01)
    *F16H 37/04*     (2006.01)
    *F16H 61/70*     (2006.01)
    *F16H 61/04*     (2006.01)

(52) U.S. Cl.
    CPC ........... *B60W 10/08* (2013.01); *B60W 10/111* (2013.01); *B60W 30/19* (2013.01); *F16H 37/046* (2013.01); *F16H 61/70* (2013.01); *B60W 20/00* (2013.01); *F16H 2061/0411* (2013.01); *F16H 2061/0422* (2013.01); *F16H 2061/0433* (2013.01); *Y02T 10/6221* (2013.01); *Y10S 903/902* (2013.01); *Y10T 477/26* (2015.01)

(56) References Cited

U.S. PATENT DOCUMENTS

| 2003/0032515 | A1* | 2/2003 | Holmes ............................ 475/5 |
| 2010/0105517 | A1* | 4/2010 | Borntraeger ............ F16H 3/126 |
| | | | 477/3 |

FOREIGN PATENT DOCUMENTS

| DE | 10 200 403 146.3 A1 | 1/2006 |
| DE | 10 2007 010 829 A1 | 9/2008 |
| DE | 10 200 800 238.0 A1 | 12/2009 |
| EP | 1 466 778 A2 | 10/2004 |

OTHER PUBLICATIONS

International Preliminary Report on Patentability issued in International Application No. PCT/EP2011/057169, mailed Jun. 18, 2012 (With an English Translation), 16 pages.

* cited by examiner

DRIVE TRAIN WITH AN AUTOMATED AUXILIARY-RANGE TRANSMISSION

This application is a filing under 35 U.S.C. §371 of International Patent Application PCT/EP2011/057169, filed May 5, 2011, and claims the priority of DE 10 2010 030 576.6, filed Jun. 28, 2010. These applications are incorporated by reference herein in their entirety.

The invention concerns a drive train with an automated auxiliary range transmission. It further concerns the invention of a method used to operate such a drive train.

Designed as group transmissions, automated auxiliary range transmissions with a multi-stage main transmission and an auxiliary range unit mounted downstream of the main transmission, are, for example, known from DE 10 2007 010 829 A 1 and can be used in commercial vehicles, in particular as a transmission group, auxiliary range unit and/or a splitter group mounted upstream of the main transmission, especially as a splitter group. The gear ratio of the main transmission is halved through, for example, a two-stage designed split group with about half of an average gear ratio between two successive speed steps of the gear ratios corresponding to that of the main transmission and the total number of available gears is doubled. Using, for example, a two-stage transmission group with an average gear ratio between two successive speed steps of the main transmission for the entire gear ratio of the main transmission, the spreading of the auxiliary range transmission is approximately doubled and the total number of available gears is doubled once again.

The present invention relates to a drive train with an automated auxiliary range transmission and a method for operating such a drive train, the transmission group of which includes at least one main transmission and an auxiliary range unit. The splitter group is optional. The auxiliary range unit is preferably configured as a transmission group. It may also be configured as a split group.

When one such automated auxiliary range transmission is integrated in a drive train of a motor vehicle, an input shaft of the automated auxiliary range transmission—namely, an input shaft of the main transmission or in the presence of a splitter group of an input shaft of the splitter group—is coupled with an axle drive via a controllable starter clutch with the drive unit and an output shaft of the automatic auxiliary transmission group.

Then, if the drive unit is designed as a purely internal combustion engine or as a hybrid drive with an internal combustion engine, the internal combustion engine is coupled with the input shaft of the group transmission via the starter clutch. If the drive unit is designed as a hybrid drive with a internal combustion engine and an electrical machine, the electric machine is switched either with known drive trains—either with the provision of a so-called crankshaft starter generator (KSG), between the internal combustion engine and the start clutch or with the provision of a so-called integrated starter generator (ISG)—between the starting clutch and the input shaft of the transmission group.

The well-known drive trains which have an automated auxiliary range transmission as the drive and a hybrid drive with an internal combustion engine and an electric machine as a drive unit have the disadvantage that no traction support can be provided to compensate for or to balance a torque interruption during the execution of a switch in the group transmission with the resultant loss of comfort.

According to this setup, the present invention has the basic technical problem of requiring the creation of a new drive train with an automated group transmission.

This problem is solved by a drive train according to claim 1. According to the invention, the electric machine of the hybrid drive can be coupled with the force flux or torque flux of the drive train between the main transmission and the auxiliary range unit and/or between the auxiliary range unit and the axle drive. This coupling can either be carried out permanently or switching. In the drive train according to the invention, the electric machine of the hybrid drive can be coupled with the force flux or torque flux permanently or switching between the main transmission and the auxiliary range unit and/or between the auxiliary range unit and the axle drive. With a switching in the range transmission, in particular with a switching in the main transmission and/or a switching in the splitter group, if any, traction support can thus be provided to compensate and/or balance torque interruption when the switching is implemented. This will increase the level of comfort.

According to an advantageous embodiment of the invention, the electric machine of the hybrid drive, depending on the switching position of one of the switching elements embodied as a double switching element, can either be exclusively coupled on the force and/or torque flux between the main transmission and the auxiliary range unit or exclusively coupled between the auxiliary range unit and the axle drive. Alternately, it can be completely decoupled from the torque flux and/or force flux of the drive train. Then, when the electric machine is coupled with the force flux and/or torque flux via a double switching element through which the electric machine of the hybrid drive is either exclusively coupled between the main transmission and the auxiliary range unit or exclusively decoupled between the auxiliary range unit and the axle drive, there is a particularly advantageous embodiment of the drive train, with which a variety of different operating conditions of the drive train can be covered advantageously.

Figure 2:
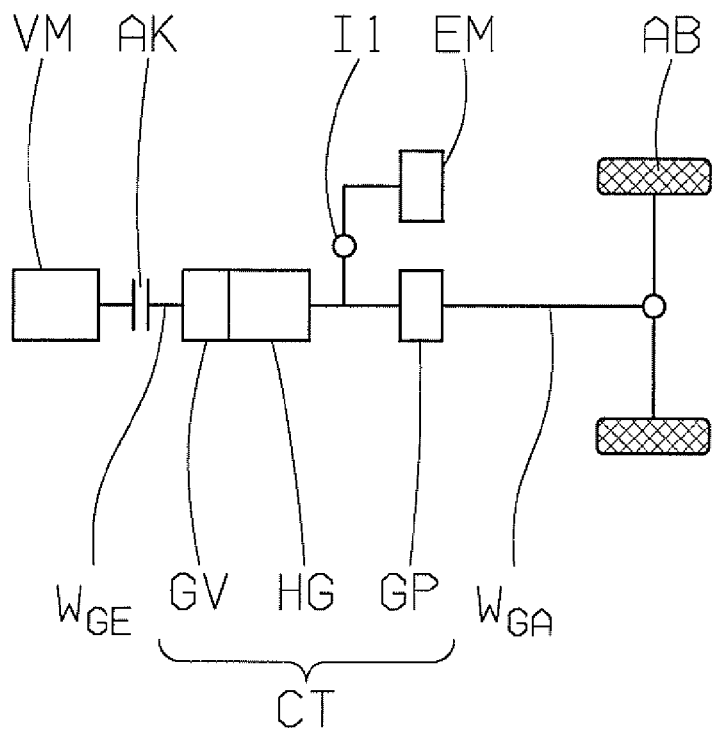
Figure 3:
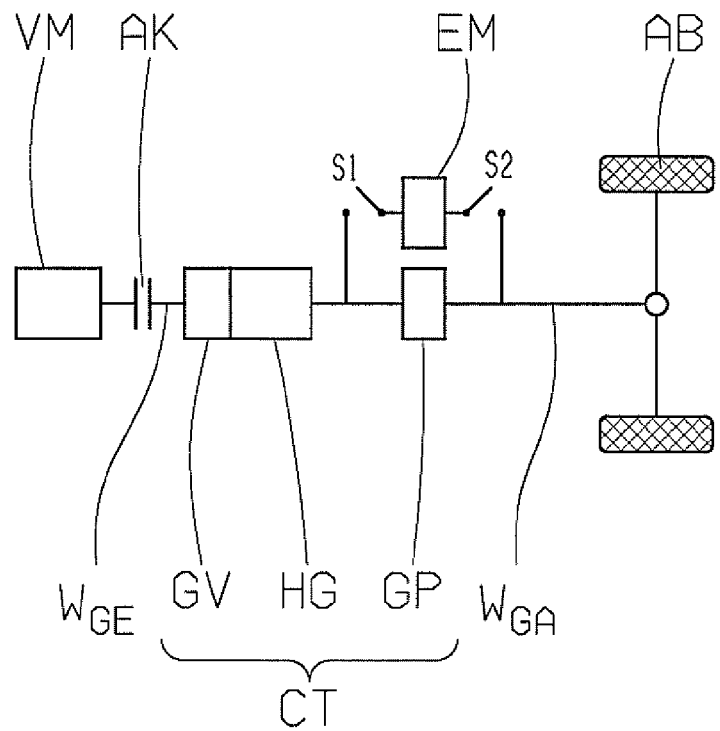
Figure 4:
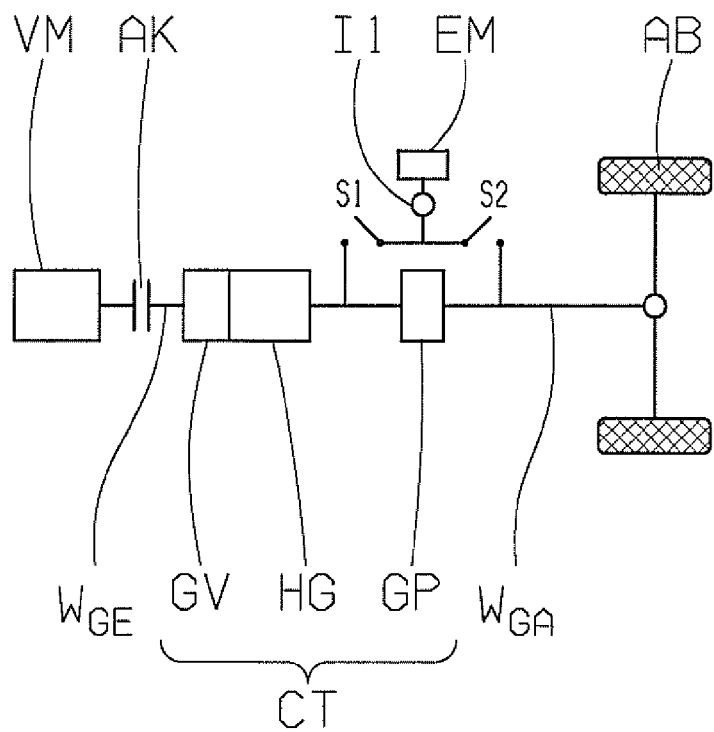
Figure 5:
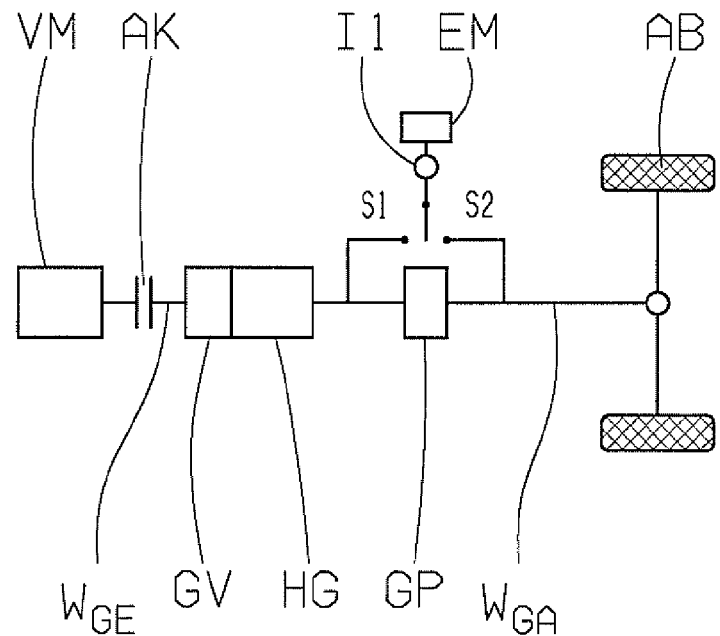
Figure 6:
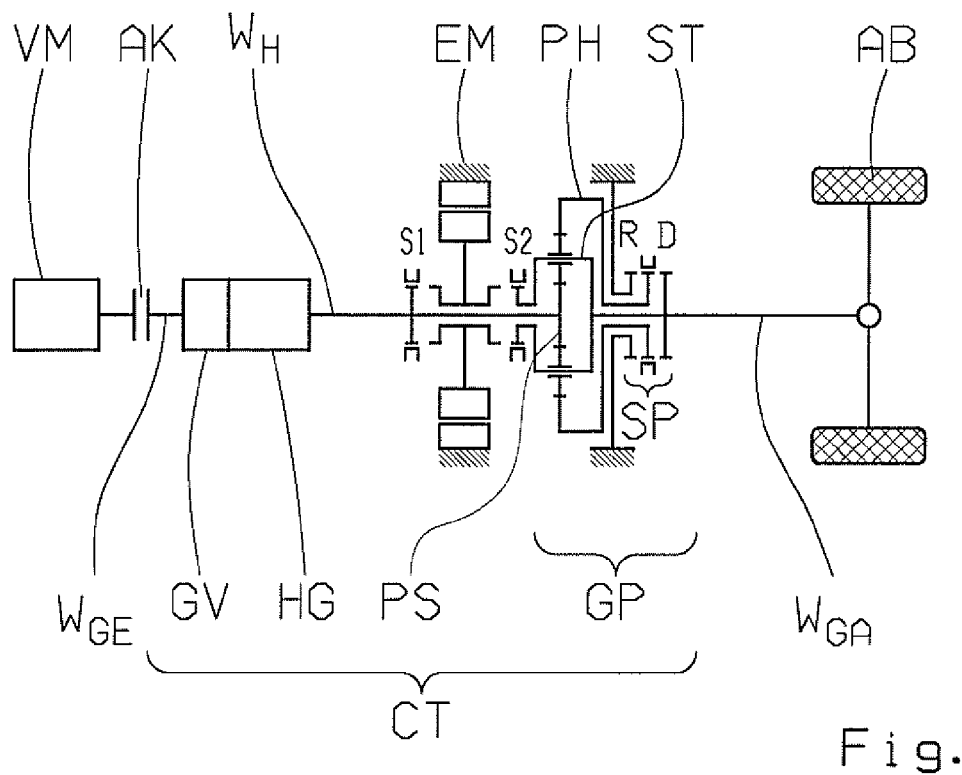
Figure 7:
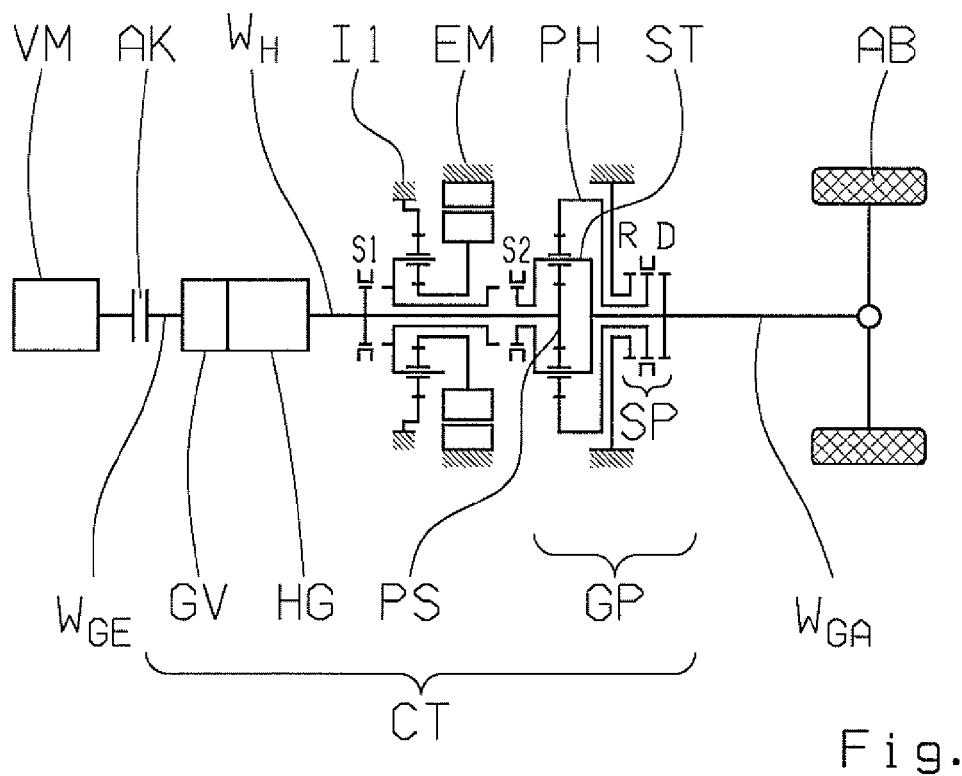
Figure 8:
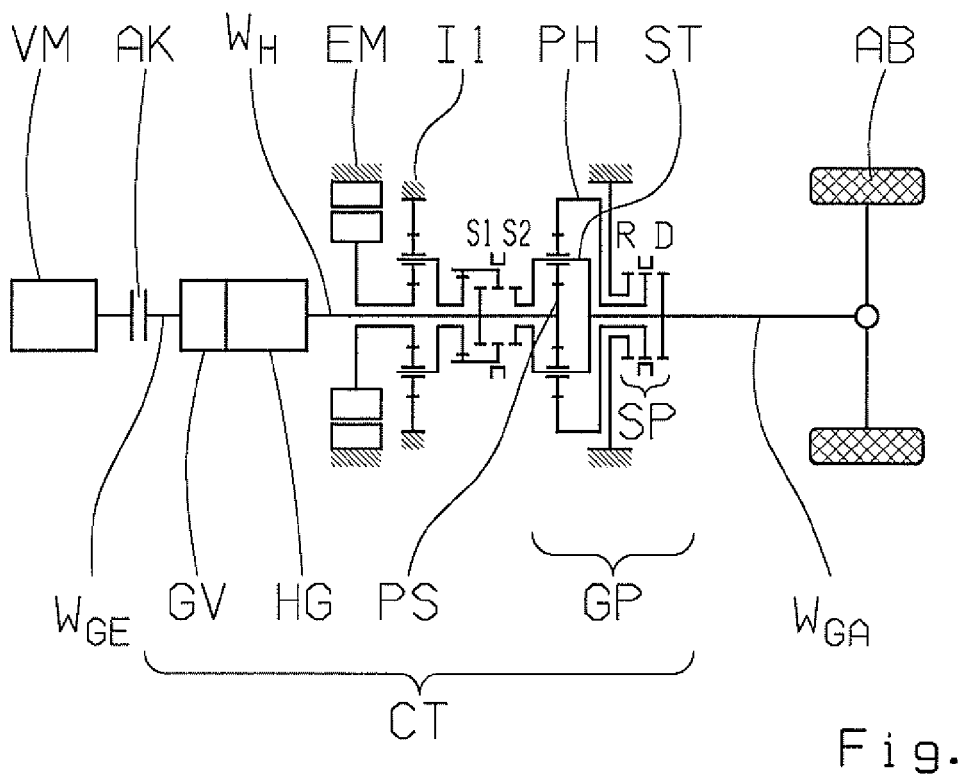
Figure 9:
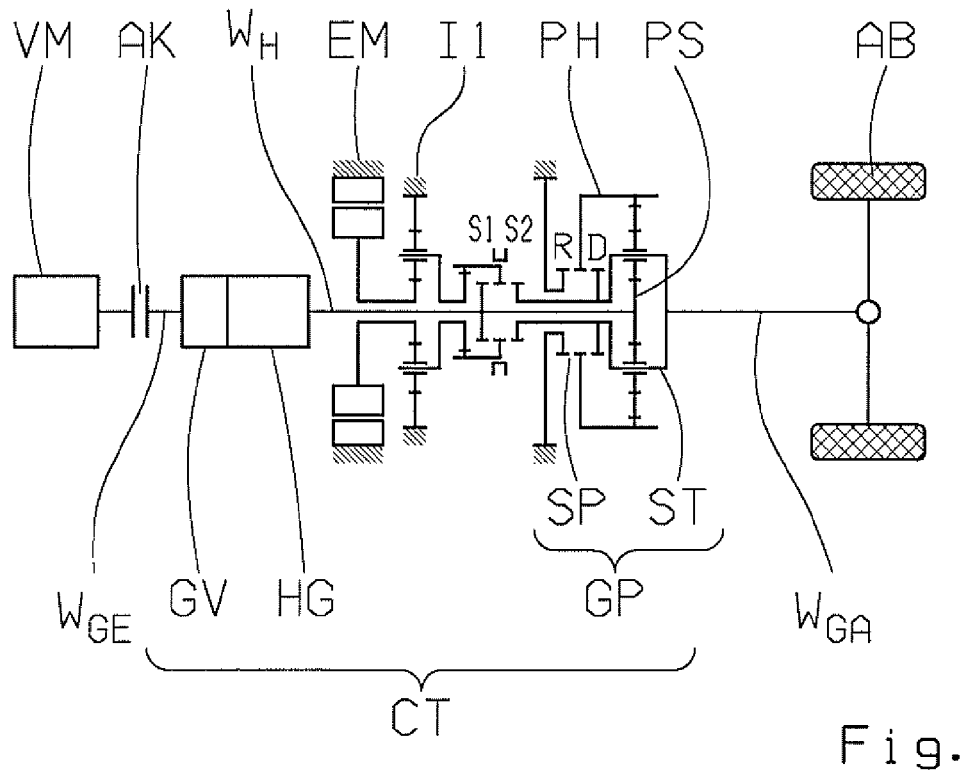
Figure 10:
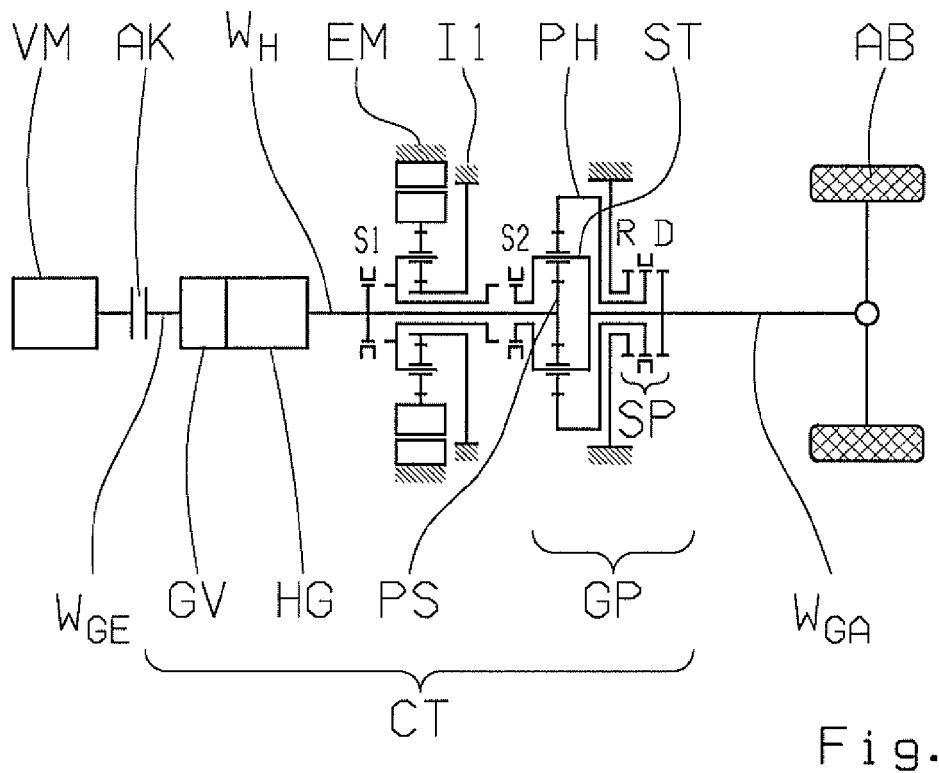
Figure 11:
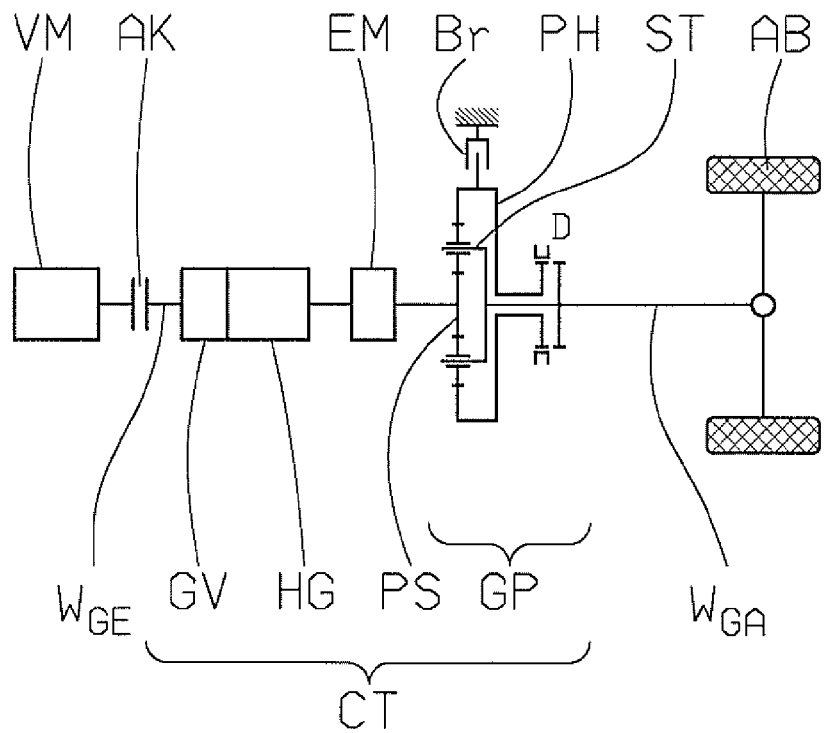
Figure 12:
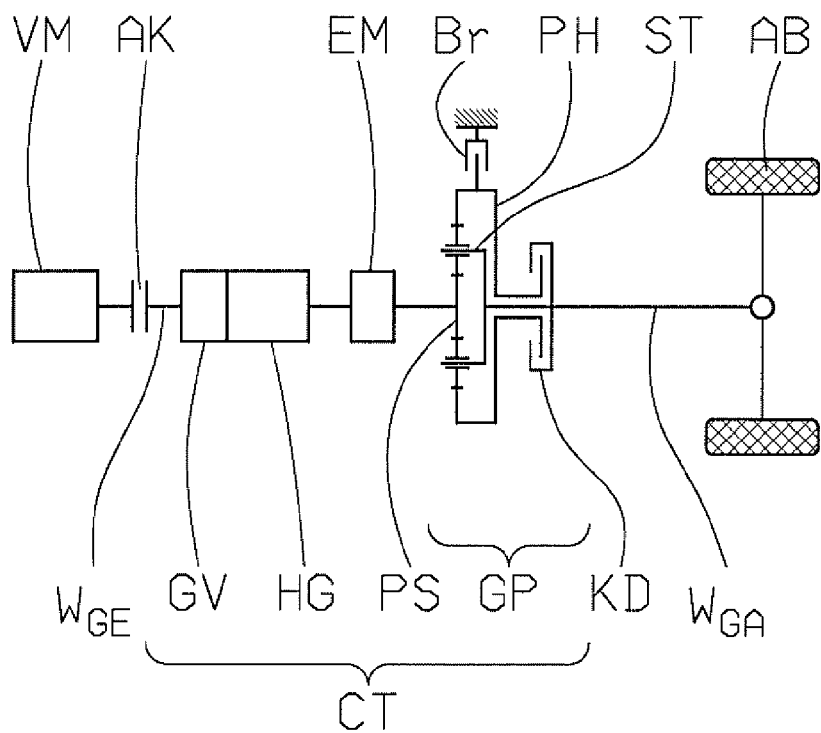

Preferred embodiments of the invention will become apparent from the claims below and the following description. Exemplary embodiments of the invention, without being limited thereto, are illustrated in more detail with reference to the drawing. It shows:

FIG. 1 a diagram of a drive train according to a first embodiment of the invention;

FIG. 2 a diagram of a drive train according to a second embodiment of the invention;

FIG. 3 a diagram of a drive train according to a third embodiment of the invention;

FIG. 4 a diagram of a drive train according to a fourth embodiment of the invention;

FIG. 5 a diagram of a drive train according to a fifth embodiment of the invention;

FIG. 6 a diagram of a drive train according to a sixth embodiment of the invention;

FIG. 7 a diagram of a drive train according to a seventh embodiment of the invention;

FIG. 8 a diagram of a drive train according to an eighth embodiment of the invention;

FIG. 9 a diagram of a drive train according to a ninth embodiment of the invention;

FIG. 10 a diagram of a drive train according to a tenth embodiment of the invention;

FIG. 11 a diagram of a drive train according to a further embodiment of the invention; and FIG. 12 a diagram of a drive train according to a further embodiment of the invention.

This invention concerns a drive train of a motor vehicle, particularly a commercial vehicle, wherein the drive train comprises at least a hybrid drive having an internal combustion engine VM, and an electric machine EM, and an automated auxiliary-range transmission CT. The automated auxiliary-range transmission CT has at least one main transmission HG and an auxiliary range unit GP mounted downstream of the main transmission HG, in particular as a range group. In the execution example shown in FIG. 1 the auxiliary-range transmission CT also has a split group GV mounted upstream of the main transmission, wherein the split group GV is preferably designed as a split group. In accordance with FIG. 1, the internal combustion engine VM can be coupled with an input shaft $W_{GE}$ of the automated auxiliary range transmission via a controllable starter clutch AK. An axle shaft $W_{GA}$ of the automated auxiliary-range transmission CT is connected to an axle drive AB.

As already stated, the drive train of FIG. 1, asides from the internal combustion engine VM also has an electric machine EM. The internal combustion engine VM and electric machine EM together form a hybrid drive, whereby, in the sense of the present invention, the electric machine EM of the hybrid system can be coupled with the force flux and/or torque flux of the drive train between the main transmission HG and auxiliary range unit GP and/or between the auxiliary range unit GP and the axle drive AB. In the exemplary FIG. 1, the electrical machine EM of the hybrid drive is permanently coupled to the force flux and/or torque flux between the main transmission HG and the auxiliary range unit GP of the drive train.

In the drive train of FIG. 1, it is possible via the electric machine EM of the hybrid drive, to provide a traction support to balance and/or compensate a torque interruption with the execution of a gear shift in the main transmission HG as well with the execution of a gear shift in the splitter group GV.

Here, the auxiliary range unit GP is used as transmission drive for the electric machine EM of the hybrid drive. In this manner, a variety of hybrid functions can be provided, such as purely electric driving, a start/stop function for the internal combustion engine VM, a so-called electric boosting and recuperation.

The completion and/or compensation of a torque interruption by providing traction support via the electric machine EM of the hybrid drive is possible in the drive train of FIG. 1 with all gears in the main transmission HG and with all circuits in the splitter group GV. In the drive train in FIG. 1, only the auxiliary range unit GP circuits remain traction interrupted.

If, in the drive train of FIG. 1, the main transmission HG has a so-called overdrive gear with a ratio <1, this overdrive gear is inserted in the main transmission HG if the internal combustion engine VM is to be started using the electric machine EM. In this case, relatively little torque must be provided and/or applied by the electric machine EM of the hybrid drive to start the internal combustion engine VM.

Furthermore, in the drive train of FIG. 1 during the so-called recuperation, meaning when braking using the electric machine's EM torque, it is possible to track a gear in the main transmission HG, namely with a continuing full torque of the electric machine EM. This is particularly advantageous when a driver accelerates again and a short response time is required for acceleration. In this case, the appropriate gear for the internal combustion engine VM is already installed in the main transmission HG.

As already stated, in the drive train in FIG. 1 the electric machine EM of the hybrid drive uses the transmission of the auxiliary range unit GP. The internal combustion engine can be started by the electric machine EM of the drive train when the drive train is at a standstill. Further, when the drive train is at a standstill, the electric machine EM can be driven by a generator to, for example, charge a battery of the drive train, or to provide a power supply for a network board. Here, the auxiliary range unit GP is in neutral position. With a gear switch in the auxiliary range unit GP, synchronization can be achieved with the aid of the electric machine EM.

A further advantageous development of the example in FIG. 1 is shown in FIG. 2. In FIG. 2, the electric machine EM is again permanently coupled with the force flux and/or torque flux of the drive train between the main transmission HG of the auxiliary range transmission CT and the auxiliary range unit GP of the auxiliary range transmission CT, in accordance with FIG. 2, under the interposition of a speed step. In accordance with FIG. 2, this speed step I1 is a constant transmission. This allows a greater torque to be provided on the axle drive AB when starting via the electric machine EM. Less torque is required when starting the internal combustion engine VM via the electric machine EM. When starting the internal combustion engine VM via the electric machine EM, the highest gears are respectively inserted into the main transmission box HG as well as into the preferably present splitter group GV. The auxiliary range unit GP is in neutral when the internal combustion engine VM is started.

In the application example in FIGS. 1 and 2, the electrical machine EM of the hybrid drive is permanently connected to the power flux and/or torque flux between the main transmission HG of the auxiliary range transmission CT and the auxiliary range unit GP of the same.

In contrast, FIGS. 3 to 5 show application examples of the invention in which the electric machine EM of the hybrid drive is coupled or can be coupled with the force and/or torque flux of the drive train, depending on the circuit of at least one switching element between the main drive HG and the range group GP and/or between the range group GP and the axle drive AB.

Therefore, in the application examples of FIGS. 3, 4, two switching elements S1 and S2 are available and can be independently controlled, whereby the electric machine EM can be coupled with the force flux and/or torque flux of the drive train between the main transmission HG and the auxiliary range unit GP can be coupled via the switching element S1, and wherein the electric machine of the hybrid drive EM can be coupled with the force flux and/or torque flux of the drive train between the auxiliary range unit GP and the axle drive AB via the switching element S2. When both of the switching elements S1 and S2 are open, the electric machine EM is completely uncoupled from the force flux and/or torque flux of the drive train. By closing both switching elements S1 and S2, the electric machine EM can be coupled on the torque and/or force flux of the drive train between the main transmission HG and the auxiliary range unit GP as well as between the auxiliary range unit GP and the axle drive AB. In FIG. 4 the speed step I1 is provided which is effective when switching element S1 is closed as well as when switching element S2 is closed.

In the application example of FIG. 5 the S1 and S2 switching elements designed as independent switching elements in FIG. 4 are replaced with a double S1/S2 switching element, with which the electric machine EM with the interposition of the speed step I1 is coupled with the power and/or torque flux of the drive train between the main transmission HG and the auxiliary range unit GP or between the auxiliary range unit GP and the axle drive AB.

In the switching position of the double switch element shown in FIG. 5, the electric machine EM is fully uncoupled from the force flux and torque flux of the drive train.

Although in the embodiment of the switching elements S1 and S2 as a double switching element according to FIG. 5, the electric machine EM cannot be simultaneously coupled with both the force flux and torque flux between the main transmission HG and the auxiliary range unit GP and the force flux and torque flux between the auxiliary range unit GP and the axle drive AB, the embodiment of the switching elements S1 and S2 according to FIG. 5 is preferable, as this embodiment is constructively simpler.

The switchable coupling of the electric machine EM of the hybrid drive to the force flux and/or torque flux of the drive train according to FIGS. 3 to 5 allows an especially preferred operation of the drive train.

So, with the drive trains of FIGS. 3 to 5, it is not only possible to prepare traction support by executing a gear shift in the main transmission HG as well as a gear shift in the splitter group GV, but also by executing a gear shift in the auxiliary range unit GP. For this purpose, the procedure is such that prior to the execution of a gear shift in the auxiliary range unit GP, the electric machine EM is coupled to the force flux and torque flow of the drive train between the range GP and the axle drive AB and remains coupled during the execution on the transmission output shaft $W_{GA}$. As a result, by executing a gearshift in the auxiliary range unit GP, the electric machine EM works permanently on the axle drive AB and can thereby provide traction support for the drive train.

Furthermore, in the drive trains of FIGS. 3 to 5, a lag in gear shifting over the range of all gears during recuperation is possible.

Then, when the electric machine EM of the hybrid drive is completely decoupled from the force flux and torque flux of the drive train, for example, no-load losses of the electric machine, when driving at a constant speed, can be avoided.

Furthermore, should an error occur in the electric machine EM of the hybrid drive in the completely uncoupled state, a conventional, purely internal combustion engine operation of the drive train via the internal combustion engine VM of the hybrid drive is possible.

When, as shown in FIGS. 3 and 4, the switching elements S1 and S2 are embodied as independent circuit elements, the electric machine EM of the hybrid drive can be coupled with the force flux and/or torque flux of the drive train at the same time between both the main transmission HG and auxiliary range unit GP as well as between the auxiliary range unit GP and the axle drive AB, whereby it is possible, for example, to block the output shaft or transmission output shaft to provide a $W_{GA}$ parking brake for the drive train.

The switching elements S1 and S2 of the drive train in FIGS. 3 to 5 are preferably claw switching elements which are synchronized via the electric machine EM.

The switching elements S1 and S2 are preferably pneumatically operated by compressed air.

Further advantageous embodiments and modes of operation of a drive train with an electric machine EM of a hybrid drive, which can be connected to the force flux and torque flux of the drive train between the main transmission HG and the auxiliary range unit GP and/or between the auxiliary range unit GP and axle drive AB, as defined in FIGS. 3 to 5, are described below with reference to FIGS. 6 to 10, wherein FIGS. 6-10 show variants of the invention-related drive train, in which the auxiliary range unit GP is embodied as a transmission group and/or range group in planetary design.

FIGS. 6 to 10 show an auxiliary range unit and/or transmission group in planetary design, wherein a sun gear PS of the auxiliary range unit GP is coupled with a main shaft $W_H$ of the main transmission HG, and wherein a web ST of the auxiliary range unit GP is coupled with the axle drive AB via the output shaft $W_{GA}$ of the transmission group GT. A ring gear PH of the auxiliary range unit GP is connected with the switching package SP of the auxiliary range unit GP wherein the switching package SP alternately switches the auxiliary range unit via the connection of the ring gear PH with a stationary housing part into a range driving stage R, or by connection of the ring gear PH with the transmission output shaft $W_{GA}$ of the group transmission CT into a direct driving stage D.

Furthermore, FIGS. 6 to 10, in turn show the switching elements S1 and S2 which are embodied in FIG. 6 via a double switching element, wherein the electric machine EM is coupled between main transmission HG and auxiliary range unit GP on the main shaft $W_H$ of the main transmission HG in the switching position S1, and thereby on the sun gear PS of the auxiliary range unit GP, and whereby the electric machine EM is coupled with the transmission output shaft $W_{GA}$ between the auxiliary range unit and axle drive AB via web ST in shift position S2.

As already mentioned, with the connectable connection of the electric machine EM of the drive train on the force flux and/or torque flux of the drive train, a gear lag may occur in the recuperation across all gears. When the auxiliary range unit GP is in the range drive gear at the beginning of the recuperation, the auxiliary range unit GP does not need to be connected. If, however, the auxiliary range unit GP is in the direct drive gear D at the start of recuperation, it must be connected in order to provide the appropriate gear for the internal combustion engine. In FIG. 6 the electric machine EM of the hybrid drive remains coupled with the transmission output shaft $W_{GA}$ via the switching position S2 and can then recuperate without interruption.

FIG. 7 shows a variant of the invention based on FIG. 6, in which the speed step I1, which is designed as a constant transmission, is additionally present, wherein the speed step I1 in FIG. 7 is designed as planetary gear with the so-called stationary gearing transmission.

FIG. 8 shows an alternative to FIG. 7 wherein FIG. 8 differs from FIG. 7 in that the switching elements S1 and S2 are realized as a common switching package, and, in FIG. 8, the constant transmission I1 is positioned between the electric machine EM and the auxiliary range unit GP. In FIG. 7, however, the switching elements S1 and S2 are designed as separate assemblies and the speed step I1 is positioned between the main transmission HG and electric machine EM.

FIG. 9 shows a modification of the drive train in FIG. 8, in which the switching package SP, through which the auxiliary range unit GP is switchable either in the range drive gear R or the direct drive gear D, is not as shown positioned between the gears of the planetary gear and axle shaft AB as in FIG. 8, but rather positioned between the switching elements S1, S2, and the gears of the planetary gear.

While the design in FIG. 8 is above all suitable for high constant transmissions of the speed step I1, the design in FIG. 9 is suitable above all for medium constant transmissions of speed step I1.

A further alternative for a constructive design is shown in FIG. 10, wherein the switching elements S1 and S2 are not provided by a common switching packet, but again via separate switching elements, wherein in FIG. 10, the speed step I1 is positioned between electric machine EM and auxiliary range unit GP, and wherein in FIG. 10 the switching packet SP of the auxiliary range unit GP is positioned between the gears of the planetary gear of the auxiliary range unit GP and the axle drive AB.

FIG. 11 shows a variant of the invention in which the electric machine EM of the hybrid drive is permanently connected to the force flux and/or torque flux of the drive train between the main transmission HG and auxiliary range unit GP, wherein the auxiliary range unit GP is designed in planetary structure and wherein a friction brake BR is associated with the ring gear PH of the auxiliary range unit GP. The friction brake Br, which is associated with the ring gear of the auxiliary range unit GP, can be used to assist in starting the internal combustion engine VM from an electric drive to offset motor fluctuation. The internal combustion engine VM is hereby started by closing the starting clutch AK, whereby a stray torque can be inserted in the drive train via motor fluctuations. This can be compensated by the brake Br.

The slipping brake Br is ideally defined as a dry brake, with which no drag losses arise on the brake Br with bridged auxiliary range unit GP.

The friction brake Br can still be used as a start element. So starting with the vehicle standing still in which the auxiliary range unit is in neutral and in which a gear is inserted in the main transmission it is possible to first apply a starting torque on the brake by applying a supporting torque and in the splitter group by means of the electric machine battery charged by a generator. Then, the slipping is displaced on the starting clutch AK and the brake Br fully engaged as the start clutch, which is in total contrast to the brake Br that is structurally designed as a start element and is therefore more prone to wear. In addition, at the start of the internal combustion motor VM, the brake Br may initially be used as a starting element via a slip start-up clutch AK and the simultaneous start, wherein in turn the function of the starting element is displaced on the starting clutch AK and the brake Br is completely engaged.

It should be noted that, even in the variant of FIG. 11, the electric machine EM can be coupled to the torque and/or force flux of the drive train via at least one switching element.

FIG. 12 shows a further variant of FIG. 11, wherein, in the variant of FIG. 12, a friction lock-up clutch KD is also associated with the auxiliary range unit GP in addition to the brake Br. In the application example of FIG. 12, the electric machine EM is again permanently coupled with the torque and/or force flux of the drive train between the main transmission HG of the auxiliary range unit GP, wherein the electric machine EM engages the sun gear SP of the auxiliary range unit GP. The brake Br in turn engages the ring gear PH on the auxiliary range unit GP. The lock-up clutch is designed so that a first coupling half of it is associated with the ring gear PH and a second coupling half of it is associated with the web ST and thereby the transmission output shaft $W_{GA}$.

By using the brake Br in connection with the lock-up clutch KD, the auxiliary range unit GP, designed as a range and/or transmission group, is shiftable.

In FIG. 12, the driving torque can be lowered to the torque which the electric machine EM alone can generate during a power shifting of the load circuit of the auxiliary range unit GP to lower the driving torque. In this way, the load on brake Br and lock-up clutch KD is reduced.

In the application example of FIG. 12, the electric machine EM can, as in the version in FIG. 11, be coupled with the torque and/or force flux of the drive train with the interposition of a speed step.

REFERENCE SIGNS

AB Axle drive
AK Start-up clutch
Br Brake
CT Group transmission
D Direct drive gear
EM Electric machine
GV Splitter unit
GP Auxiliary range unit
HG Main gear
HW Hollow shaft
I1 Speed step
KD Lock-up clutch
PS Sun gear
PT Planet carrier
PH ring gear
R Range drive gear
SP Switching packet
S1 Switching element/switch position
S2 Switching element/switch position
VM Internal combustion engine
$W_{GA}$ Output shaft
$W_{GE}$ Input shaft
$W_H$ Main shaft

The invention claimed is:

1. A drive train of a motor vehicle, comprising:
an internal combustion engine;
an auxiliary range transmission, comprising:
  a main transmission,
  an auxiliary range unit mounted downstream of the main transmission,
  an input shaft connected to the internal combustion engine via a controllable starter clutch, and
  an axle shaft connected to an axle drive; and
an electric machine being capable of coupling with and decoupling from a power flux between the auxiliary range unit and the axle drive,
wherein the electric machine is additionally capable of coupling with and decoupling from a power flux between the main transmission and the auxiliary range unit.

2. The drive train according to claim 1, further comprising:
a first switching element to control the coupling and decoupling between the electric machine and the power flux between the main drive and the auxiliary range unit; and
a second switching element to control the coupling and decoupling between the electric machine and the power flux between the auxiliary range unit and the axle drive.

3. The drive train according to claim 2, wherein the first switching element and the second switching element are portions of a double switch element.

4. The drive train according to claim 1, wherein the electric machine is capable of being coupled with at least one power flux through a speed step.

5. The drive train according to claim 4, wherein the speed step is positioned between the electric machine and the auxiliary range unit.

6. The drive train according to claim 1, wherein the auxiliary range unit is a planetary gear system, comprising:
a sun gear, being coupled with a main shaft of the main transmission;
a ring gear; and
a web, being coupled with the axle drive, wherein the electric machine is coupled with a second power flux between the main transmission and the auxiliary range unit by connecting to the sun gear; and the electric machine is coupled with the power flux between the auxiliary range unit and the axle drive by connecting to the web.

7. The drive train according to claim 6, further comprising a frictional brake being engaged on the ring gear of the auxiliary range unit.

8. The drive train according to claim 7, further comprising a frictional lock-up clutch being associated with the auxiliary range unit, wherein a first coupling half of the-lock-up clutch engages on the ring gear and a second coupling half of the-lock-up clutch engages on the axle drive.

9. A method for operating a drive train with an auxiliary drive having a main transmission, an auxiliary range unit mounted downstream of the main transmission, an input shaft connected to an internal combustion engine via a controllable starter clutch, and an axle shaft connected to an axle drive, wherein the drive train further has an electric machine being capable of coupling with and decoupling from a power flux between the auxiliary range unit and the axle drive, and wherein the electric machine is additionally capable of coupling with and decoupling from a power flux between the main transmission and the auxiliary range unit, the method comprising:

compensating a power interruption on the axle shaft upon execution of a gearshift in the main transmission with the electric machine.

10. The method according to claim 9, the drive train including a splitter group, the method further comprising compensating a traction interruption with the electric machine on the axle drive during execution of a gear shift in the splitter group with the electric machine.

11. The method according to claim 9, further comprising inserting an overdrive gear in the main transmission for starting the internal combustion engine via the electric machine, wherein the overdrive gear has a gear ratio of less than 1.

12. The method for operating the drive train according to claim 9, wherein the electric machine is capable of coupling with and decoupling from the power flux between the main transmission and the auxiliary range unit, the method comprising remaining in a coupling position between the electric machine and the axle drive for compensation of a traction force interruption when a gear shift is executed in the auxiliary range unit and prior to execution of the gears in the auxiliary range unit.

13. A hybrid drive of a motor vehicle, comprising:
an auxiliary range transmission comprising:
at least one main transmission,
an auxiliary range unit directly coupled to a main shaft of the main transmission, and
an axle shaft connecting to an axle drive; and
an electric machine being capable of coupling with and decoupling from a power flux between the auxiliary range unit and the axle drive, and
wherein the electric machine is additionally capable of coupling with and decoupling from a power flux between the main transmission and the auxiliary range unit.

14. The hybrid drive according to claim 13, wherein the electric machine is capable of coupling with and decoupling from the power flux between the auxiliary range unit and the axle drive.

15. The hybrid drive according to claim 14, further comprising:
a first switching element to control the coupling and decoupling between the power flux between the main drive and the auxiliary range unit; and
a second switching element to control the coupling and decoupling between the power flux between the auxiliary range unit and the axle drive.

16. The hybrid drive according to claim 13, wherein the electric machine is coupled with at least one power flux through a speed step.

17. The hybrid drive according to claim 13, wherein the auxiliary range unit is a planetary gear system, which comprises:
a sun gear, being coupled with the main shaft of the main transmission;
a ring gear; and
a web, being coupled with the axle drive,
wherein the electric machine is coupled with the power flux between the auxiliary range unit and the axle drive by connecting to the web.

18. The hybrid drive according to claim 17, further comprising a frictional lock-up clutch being associated with the auxiliary range unit, wherein a first coupling half of the-lock-up clutch engages on the ring gear and a second coupling half of the lock-up clutch engages on the axle drive.

* * * * *